E. L. SMITH
DOLL CONSTRUCTION.
APPLICATION FILED MAR. 3, 1919.

1,321,135.

Patented Nov. 11, 1919.

WITNESSES
George O. Myers.

INVENTOR
ELLA L. SMITH,
BY L. A. Stanley
ATTORNEY

UNITED STATES PATENT OFFICE.

ELLA L. SMITH, OF ROANOKE, ALABAMA.

DOLL CONSTRUCTION.

1,321,135.      Specification of Letters Patent.      Patented Nov. 11, 1919.

Original application filed October 1, 1918, Serial No. 256,404. Divided and this application filed March 3, 1919. Serial No. 280,320.

*To all whom it may concern:*

Be it known that I, ELLA L. SMITH, a citizen of the United States of America, residing at Roanoke, in the county of Randolph and State of Alabama, have invented certain new and useful Improvements in Doll Constructions, of which the following is a specification.

My invention relates to improvements in doll construction, and it consists in the process of carrying out the construction and in the product. The present application is a division of my prior application, Serial Number 256404, filed October 1st, 1918.

An object of the present invention is to provide a doll construction, consisting partly of fabric and partly of plastic material, which is practically unbreakable.

A further object of my invention is to provide a process for manufacturing indestructible dolls.

A further object of my invention is to provide a process for manufacturing dolls of the type described which is economically carried out, and which can be performed by relatively unskilled labor.

Other objects and advantages will appear in the following specification, and the novel features of the invention will be particularly pointed out in the appended claims.

My invention is illustrated in the accompanying drawings, forming part of this application, in which—

Figure 1:
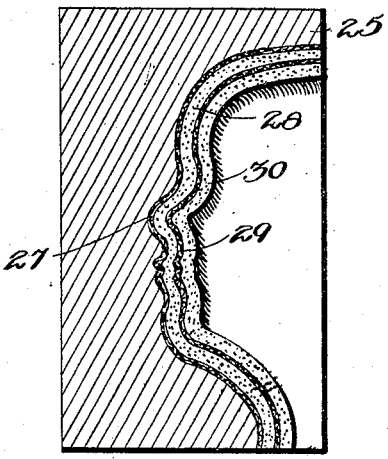
Figure 1 is a sectional view of a half mold showing layers of plastic and fabric placed therein.
Figure 2:
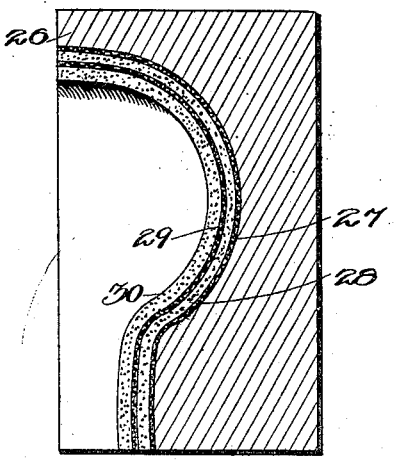
Fig. 2 is a similar view of the other half of the mold.
Figure 3:
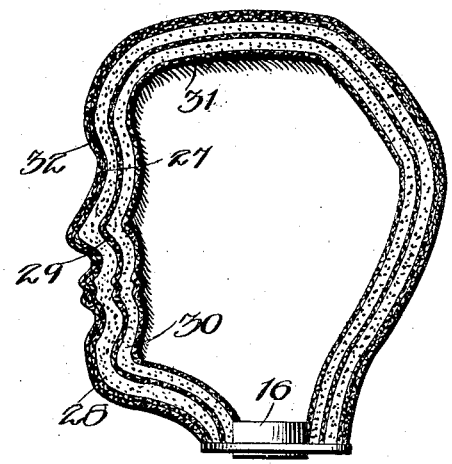
Fig. 3 is a sectional view through a completed doll's head.

Referring now to the drawings, I have illustrated a process of making a practically indestructible doll's head. In carrying out this process I provide two half molds 25 and 26 respectively, the former containing a recess for forming the front portion of the head and the latter forming the rear portion. In forming the head I first place a layer of fabric 27, such as stockinet, and then a layer of plastic material 28 such as plaster of Paris, a second stockinet layer 29 is followed by a second plastic layer 30. This procedure is carried out in both of the half molds, and the plaster is allowed to set. The forms thus made are removed from the molds and placed together, and then plastic material is poured on the inside to form a layer 31 which is allowed to harden, thus uniting the parts together. The edges of the joint are now trimmed on the outside of the head and a coating of paste, or other suitable cementitious matter is applied and a final outside layer 32 of stockinet is slipped over the head and tightly drawn to the surface thereof, this layer being pressed in at all points so as to conform exactly to the form of the head, and the paste is allowed to set. The doll, as formed, may now be painted.

A doll's head constructed according to this process is practically indestructible. Even though the plastic material should be shattered by a blow it cannot get out of position. The outer layer of stockinet securely holds the two parts of the head together and the head has the appearance of being made in one piece.

Obviously this method of construction could be applied to the trunk or main body portion of the doll without departing from the spirit of the invention.

Figure 4:
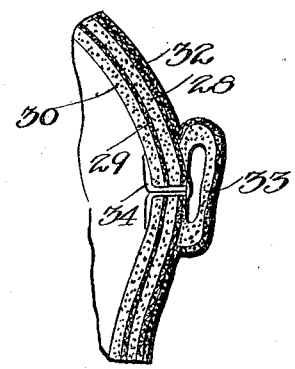
Fig. 4 is a detailed view showing the means of attaching the ear.

In Fig. 4 I have shown means by which an ear may be attached to the doll's head with a minimum of labor. The ear 33, which may be made of molded plastic material such as plaster of Paris or the like, is provided with an opening through which a staple 34 may be inserted. The latter is then passed through the side of the head and clenched on the inside as shown in the drawing.

The process of making the doll's head and body are equally applicable to the bodies of animals. Furthermore, these features would be equally applicable to animals or dolls having natural or artificial wigs or hair, instead of painted hair, and having other forms of eyes than painted eyes, such as buttons and the like, without departing from the spirit of the invention. It will be understood, furthermore, that the term doll is designed to include any toy figure.

While I have mentioned fabric as being the material preferably used in connection with the plastic material for manufacturing doll's parts, other materials such as soft leather of one form or another, might be used without departing from the spirit of the invention.

I claim:

1. The herein described process of constructing doll parts which consists in forming an initial layer of fabric in two half molds, applying subsequent layers of plastic material, fabric, and plastic material in the order named, allowing the plastic material to set, fitting together the two half forms thus made, and applying a layer of plastic material on the inner side of the forms to bind the two forms together.

2. The herein described process of constructing doll parts which consists in forming an initial layer of fabric in two half molds, applying subsequent layers of plastic material, fabric, and plastic material in the order named, allowing the plastic material to set, fitting together the two half forms thus made, applying a layer of plastic material on the inner side of the forms to bind the two forms together, applying a coating of cementitious matter of the outer surface of the united forms, and finally applying a layer of fabric on the exterior.

3. A doll's parts construction comprising two half portions consisting of alternate layers of fabric and plastic material, said half portions being fitted together, a layer of plastic material on the inner side of the portions for holding them together, and a layer of fabric cemented to the exterior of the fitted portions, said fabric layer covering the joint between the portions and aiding in holding the portions together.

In testimony whereof I affix my signature.

ELLA L. SMITH.

Copies of this patent may be obtained for five cents each, by addressing the "Commissioner of Patents, Washington, D. C."